Feb. 15, 1955  B. E. STERNE  2,702,188
LEAF SPRING INTERLINER
Filed Sept. 16, 1953 2 Sheets-Sheet 1
FIG. 1.
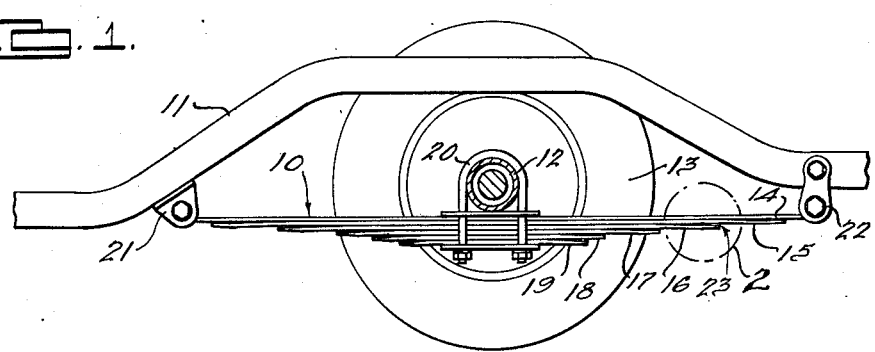
FIG. 2.
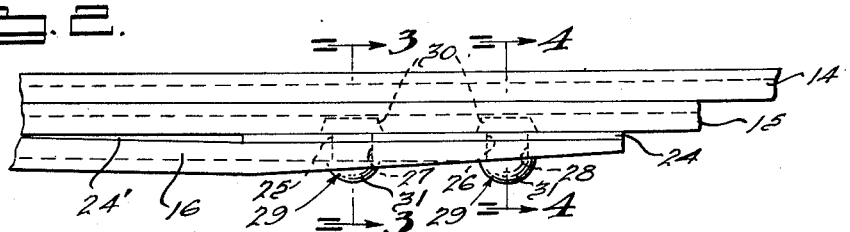
FIG. 3.
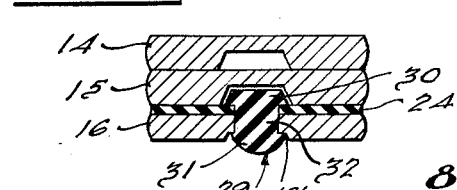
FIG. 4.
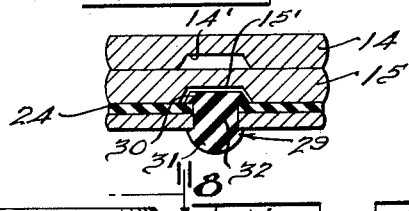
FIG. 5.
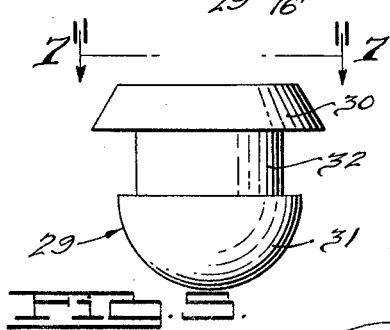
FIG. 6.
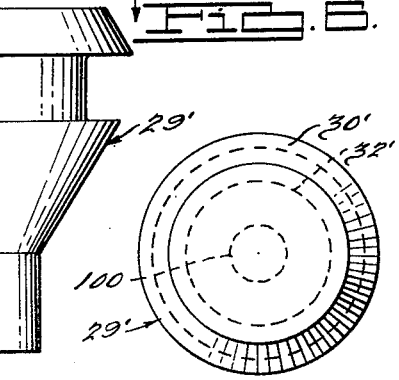
FIG. 7.
FIG. 8.
INVENTOR.
Bernhard E. Sterne.
BY
Harness and Harris
ATTORNEYS.

Feb. 15, 1955 B. E. STERNE 2,702,188
LEAF SPRING INTERLINER
Filed Sept. 16, 1953 2 Sheets-Sheet 2

INVENTOR.
Bernhard E. Sterne.
BY
Harness and Harris
ATTORNEYS.

2,702,188

LEAF SPRING INTERLINER

Bernhard E. Sterne, Detroit, Mich., assignor to Chrysler Corporation, Highland Park, Mich., a corporation of Delaware Application September 16, 1953, Serial No. 380,409

12 Claims. (Cl. 267—49)

My invention relates to an improved leaf spring of the type used in vehicles and, particularly, to an improved interliner for slidably supporting one of a pair of adjacent spring leaves upon the other.

This application is a continuation-in-part of my application, Serial No. 128,373, now abandoned.

A principal object of my invention is to provide a leaf spring with an improved interliner for reducing vibration and noise normally caused by metal to metal contact of the individual leaves as well as frictional resistance to sliding of leaves with respect to each other.

A further object of my invention is to provide an improved spring leaf interliner which is readily removable and replaceable from between the opposed surfaces of the adjacent leaves of the spring when so desired.

Still another object of my invention is to provide a spring leaf interliner including a noiseless, resilient, non-metallic fastening means for fixing the interliner to the spring leaf.

Other objects of my invention are to provide an improved spring leaf interliner which is completely non-metallic; to provide an interliner of this kind which is fixed to one spring leaf and which has a securing portion riding in a groove in another leaf; and to provide a spring leaf interliner which is sufficiently flexible to conform to the curvature of opposed surfaces of adjacent leaves of the spring and which is both economical and easy to manufacture.

It is an additional object of the invention to provide a spring leaf interliner including a noiseless, resilient, fastening means which is adapted for mounting in spring leaves which are not provided with a longitudinal groove.

Other objects and advantages will become more apparent from the following description of one or more embodiments of my invention, reference being had to the accompanying drawings in which:

Fig. 1 is a side elevational view of a vehicle suspension which includes a leaf spring embodying my invention;

Fig. 2 is an enlarged elevational view of the structure disposed within the circle 2 in Fig. 1;

Fig. 3 is a transverse sectional view taken on the line 3—3 of Fig. 2;

Fig. 4 is a transverse sectional view taken on the line 4—4 of Fig. 2;

Fig. 5 is an enlarged elevational view of the connecter member shown in section in Figs. 3 and 4;

Fig. 6 is a side elevational view of a modified form of the connector shown in Fig. 5;

Fig. 7 is an end view taken on the line 7—7 of Fig. 5;

Fig. 8 is an end view taken on the line 8—8 of Fig. 6;

Figure 9:
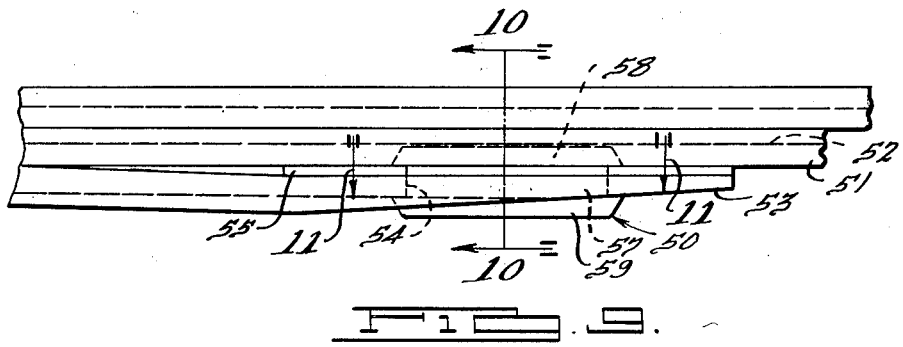
Fig. 9 is a side elevational view of a leaf spring embodying a modified form of my invention.

In the form shown, my improved leaf spring, generally designated in Fig. 1 by the numeral 10, is interposed between the sprung portion of a vehicle chassis which includes a frame 11, and the unsprung portion of the vehicle which includes the axle housing 12 and wheel 13. The spring 10 has a main leaf 14 and five underlying leaves 15, 16, 17, 18 and 19 of varying lengths, the lengths of the leaves decreasing inversely as the order of the numerals applied thereto. The intermediate portion of the leaf spring 10 is rigidly clamped on the axle housing 12 by a U-shaped bolt 20 which firmly holds the leaves in a superimposed relation. The bolt 20 clamps the middle portions of the leaves together in a metal to metal contact and resists all relative shifting movement of the leaves at this location. The front end of the main leaf 14 is pivotally connected to the frame 11 by a bracket 21 and the rear end of the main leaf is pivotally secured to the frame 11 by a shackle 22 which depends from and is swingably mounted on the frame 11.

Each of the outer end portions of the spring leaves 15, 16, 17, 18 and 19 are held in spaced relation from the lower surface of the spring leaf directly disposed above by interliners, generally designated by the numeral 23. There is thus provided tapering recesses 24' between adjacent leaves having their greater depth adjacent the inner end of the interliners.

The interliners 23 comprise a separator 24 and rubber-like plugs 29 for holding the separator in position. The separator 24 is of rectangular configuration which engages the upper surface of the end portion of each of said leaves and which also engages the lower surface of the leaf disposed directly above. For the purposes of simplicity and illustration, the following description will be directed to the interliner disposed between the leaves 16 and 15. The separator 24 thereof is composed of anti-friction materials and is provided with two spaced openings 25 and 26 in substantially the center portion thereof. The separator 24 may comprise any type of conventional non-metallic anti-friction material and preferably has a solid lubricant content. It may be molded or extruded from a suitable compound, such, for example, as a mixture of fibrous material, preferably asbestos, finely divided liquid lubricant, such as graphite, and a suitable binder. The binder may comprise natural or synthetic rubber compounds, synthetic resins, asphalt or combinations of such materials. If the compound has been molded, calendered or extruded to sheet form, it may be solidified by suitable treatment depending upon the nature of its binder content. When the binder comprises natural or synthetic rubber or thermosetting type of synthetic resin, it may be brought to a set state in a heat curing operation. If desired, the separator 24 may be formed of woven material and the binder omitted. The end portion of the leaf 16 is provided with holes 27 and 28 which register with the openings 25 and 26, respectively, when the separator 24 is placed in position.

To hold the separator 24 in position, the interliner construction is provided with a pair of the rubber-like plugs 29, each of which is provided with spaced head portions 30 and 31 having a neck portion 32 therebetween. The rubber-like plugs 29 may comprise any type of suitable yieldable rubber-like material including natural rubber compounds but is preferably composed of oil resisting synthetic rubbers such as neoprene and buna N compounds. The neck portion 32 is disposed within the opening 23 and the hole 27 while the head portion 30 engages the separator 24 adjacent the opening 28 and the head portion 31 engages the leaf 16 adjacent the hole 27. In a like manner, a plug 29 is disposed within the opening and holes 26 and 28. The rubber-like plugs 29 are yieldable and may be stretched so that the head 31 thereof is pulled or pushed through the opening and hole in the separator and leaf, respectively, and the separator and leaf are clamping held together by the head portions 30 and 31. Each of the spring leaves 14 through 19 are provided on their undersides with centrally located longitudinal grooves 14' through 19', respectively, which extend throughout their entire lengths. The head portions 30 of the rubber-like plugs 29 are of a predetermined configuration so that they may be disposed within the grooves 14' through 19' of Figs. 1 through 4 to maintain the leaves in superimposed relationship and resist any lateral movement therebetween. As shown in the drawings, the head portion 30 is frustro-conical, but the configuration may be varied in accordance with the shape of the groove in the leaf, keeping in mind that this head portion yieldably resists lateral movement. The head portion 31 is shown as hemi-spherical in the drawings but this configuration may also be varied as long as its clamping action is not lost without departing from the spirit of the invention. By disposing the head portion 30 within the grooves of the leaves, as illustrated in Figures 1 through 4, so that all relative lateral movement of the leaves is resisted, conventional side clamps which are generally used to prevent lateral movement are no longer needed. As shown in Fig. 3, the head portion 31 of the rubber-like plug 29 is also partially disposed within the grooves 16', the effective length of the neck portion 32 of the plug being substantially stretchable to the distance between the upper surface of the separator 24 and the floor of the groove 16'. It may be clearly seen in Fig. 2 that the end portions of the leaves are tapered so that the groove 16' is shallower at the end portion of the leaf than the other locations therein. In Fig. 4 I have shown the plug 29 disposed within the opening 26 and the hole 28 at a location where the depth or thickness of the spring leaf 16 is reduced to a point where the groove 16' is no longer present. At this location, the head portion 31 of the plug 29 is not disposed within the groove 16' but engages the underside of the leaf adjacent the hole 28.

The interliners engage only limited areas of the spring leaves and they hold the opposed surfaces of the outer end portions of the leaf including the outer extremities thereof in spaced relation. In this way the extremities of each leaf are prevented from digging into the surfaces of the adjacent leaf and the main relative movement of the leaves, which occurs at the outer end portions thereof, is effectively lubricated. The action of the spring is thus maintained uniform and free from squeak throughout the normal life of the spring in most instances but if desired or needed the interliners may be conveniently removed and replaced.

In this respect, in Figs. 6 and 8 I have shown a modification of the rubber-like plug 29. This plug, generally designated by the numeral 29', comprises opposed head portions 30' and 31' having a neck portion 32' disposed therebetween. The head portion 31' of the plug 29' is provided with an outwardly extending integral projection 100. The plug 29' is disposed in the spring structure in the same manner as the plug 29 but the plug 29' is more adaptable when replacing the plug 29. In such a replacement the leaves of the spring 10 are loosened and the old plug is removed. Thereafter, the plug 29' is inserted into the registering opening and hole, such as 26 and 28, with the projection 100 extending therethrough. A tool (not shown) may be applied to clampingly hold the projection 100 and pull the head portion 31' through the hole in the leaf. For this reason, the head portion 31' is frustro-conical in shape to facilitate this aforementioned pulling action. The plug 29 may be used to replace another plug of identical structure but it has been found that the plug 29' will facilitate the replacement operation.

It should be noted that my improved interliner facilitates economical construction of a leaf spring. Firstly, a spring having longitudinally grooved leaves may be used as illustrated in Figs. 1 through 4 thereby affording a saving on the metal used to make the leaves. Secondly, the rubber-like plugs serve a double function by securing the separators to the leaves and resisting relative lateral movement of the leaves thereby eliminating the need of exterior lateral supports.

Figure 10:
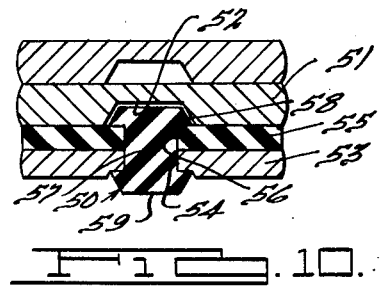
Fig. 10 is a vertical sectional view taken on the line 10—10 of Fig. 9.
Figure 11:
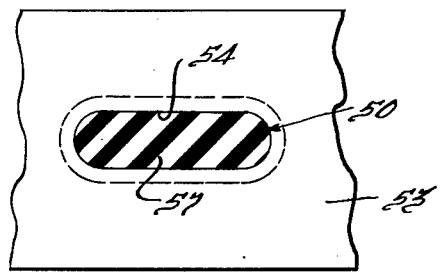
Fig. 11 is a horizontal sectional view taken on the line 11—11 of Fig. 9.

In Figs. 9, 10, and 11 a modified form of the interliner device is illustrated in which a single elongated rubber fastener 50 is used in place of the two round fasteners 29 illustrated in Figs. 1 through 8. The interliner device is mounted between an upper spring leaf 51 having a longitudinal groove 52 formed in the lower surface thereof and a lower spring leaf 53 which is provided with an elongated opening 54 therein. A non-metallic separator 55 of sheet material is disposed between the spring leaves and is provided with an elongated opening 56 in registration with the opening in the lower leaf. The fastener 50 which is in the form of a rubber-like plug, has an elongated central portion 57 extending through the registering openings in the separator 55 and lower leaf 53 and enlarged elongated terminal portions 58 and 59 defining abutments engaging the separator 55 and lower leaf 53 for clampingly securing the separator and lower leaf together. The upper terminal portion 58 is disposed in the groove 52 in spring leaf 51 to yieldably resist relative lateral movement of the spring leaves.

One advantage of the form of the invention illustrated in Figs. 9 through 11 is that the contact between the side walls of the groove 52 and the terminal portion 58 of the fastener 50 is greater than the contact when rounded fasteners are used as in Figs. 1 through 8. The terminal portion 58 and the side wall of the groove 52 are able to make straight line contact throughout substantially the length of the fastener 50 rather than only point contact as is offered by circular fasteners of the type illustrated in Figs. 1 through 8.

Figure 12:
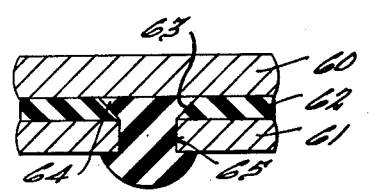
Fig. 12 is a vertical sectional view of a modified form of the invention.

Another modification of my invention is illustrated in Fig. 12. In this form of the invention an upper spring leaf 60 and a lower spring leaf 61 are illustrated, but attention is invited to the fact that the upper spring leaf 60 does not incorporate a longitudinal groove as illustrated at 15' in Fig. 4 and as illustrated at 52 in Fig. 10. In this form of the invention a separator 62 is provided with a countersunk opening 63 that is adapted to receive a frustro-conical head portion 64 of a circular fastener 65 which otherwise corresponds to the fastener 29 illustrated in Figs. 1 through 6. The Fig. 12 form of the invention in all other respects corresponds to that illustrated in Figs. 1 through 5. By providing a countersunk opening 63 in separator 62 and a frustro-conical head 64 on the fastener 65 the advantages of my novel spring leaf interliner are made available for use in springs in which the leaves are not provided with longitudinal grooves.

Figure 13:
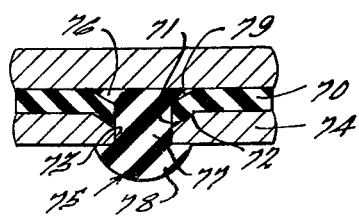
Fig. 13 is a vertical sectional view of another modified form of the invention.

Fig. 13 illustrates a modification of the Fig. 12 device. In instances where the separator 62 of Fig. 12 is made of a material which will not readily adapt itself to being countersunk it is possible to provide a separator 70 which has a circular opening 71 therein and to provide a countersunk portion 72 around the upper edge of an opening 73 in a lower spring leaf 74. A fastener 75 is provided with a frusto-conical head portion 76, a central portion 77 and enlarged lower terminal portion 78. The separator 70, which is provided with the circular opening 71 in registration with opening 73 for receiving the fastening device, is deformed into countersunk portion 72 by the downward pressure exerted thereon by the frusto-conical head 76 of the circular fastener 75. The head portion 76 of fastener 75 is disposed within an indentation 79 formed in the upper surface of separator 70 as a result of the deformation thereof into the countersunk portion 72 of spring leaf 74.

I claim:

1. A spring including two superimposed leaves, the upper of said leaves having a longitudinal groove formed in the lower surface thereof and the lower of said leaves having an opening therein, and an anti-friction device comprising a non-metallic separator engageably disposed between said leaves having an opening therein registerable with the opening in said lower leaf, and a rubber-like plug extending through said openings and having opposed rubber-like head portions securing said separator to said lower of said two leaves, one of said head portions extending into the groove in said one leaf for yieldably resisting relative lateral movement of said leaves.

2. A spring including first and second superimposed leaves, said first leaf having a longitudinal groove formed in the surface thereof adjacent said second leaf and said second leaf having an opening therein, an anti-friction device comprising a non-metallic separator of sheet material disposed between said leaves and in abutting relationship with each of said leaves, said separator having an opening therein in registration with the opening in said second leaf, and a rubber-like plug having a central portion extending through the registering openings in said separator and said second leaf and terminal portions defining abutments engaging said separator and said second leaf for clampingly securing said separator and second leaf together, said terminal portions comprising rubber-like enlargements, one of said enlarged terminal portions being disposed in the groove in said first leaf to yieldably resist relative lateral movement of said spring leaves and the other of said terminal portions having its yieldability and size predetermined relative to the size of the opening in said second spring leaf to accommodate insertion thereof through said opening by pushing on said plug.

3. In a composite leaf spring comprising a plurality of superposed spring leaves, a dampener means comprising an attritional liner means insertable between adjacent faces of two of said spring leaves, and compressible button means insertable through said liner and one of said two leaves and having a compressible head portion receivable within a concavity formed in the compression side of the other of said two leaves.

4. For use between a pair of superposed and adjacent spring leaves of a composite leaf spring, a combined attritional and viscous dampener means, comprising in combination, a liner of friction producing sheet material insertable between adjacent faces of a pair of said spring leaves, and resilient, compressible button means inserted through said liner and an underlying one leaf of said pair of said spring leaves, said button means having a mushroom shaped upper head which adjacently overlies a portion of said liner and is receivable within a concavity formed in the underside of the overlying other leaf of said pair of leaves; and a lower conical shaped head portion formed at the lower end of said button which is insertable through said linear and said one underlying leaf for locking engagement with the underside of the latter whereby said button means serves to tightly hold said liner to said underlying leaf.

5. A spring including first and second superimposed leaves, said first leaf having a longitudinal groove formed in the surface thereof adjacent said second leaf and said second leaf having an opening therein, an anti-friction device comprising a non-metallic separator of sheet material disposed between said leaves and in abutting relationship with each of said leaves, said separator having an opening therein in registration with the opening in said second leaf, a rubber-like plug having a central portion extending through the registrating openings in said separator and said second leaf and terminal portions defining abutments engaging said separator and said second leaf for clampingly securing said separator and second leaf together, said terminal portions comprising rubber-like enlargements, one of said enlarged terminal portions being disposed in the groove in said first leaf to yieldably resist relative lateral movement of said spring leaves and the other of said terminal portions including an integral projecting portion of reduced diameter which is smaller than the diameter of the opening in said second spring leaf, said projecting portion being adapted to be gripped by a tool for pulling thereon to facilitate deformation of said last mentioned terminal portion and insertion thereof through the opening in said second spring leaf.

6. In a composite leaf spring comprising a plurality of superposed spring leaves, a dampener means comprising, an attritional liner means insertable between adjacent faces of two of said spring leaves, and rubber-like button means insertable through said liner and one of said two leaves and having a head portion receivable within a concavity formed in the compression side of the other of said two leaves.

7. For use between a pair of superposed and adjacent spring leaves of a composite leaf spring, a combined attritional and viscous dampener means, comprising in combination, a liner of friction producing sheet material insertable between adjacent faces of a pair of said spring leaves, and resilient, rubber-like button means inserted through said liner and an underlying one leaf of said pair of said spring leaves, said button means having a mushroom shaped upper head which adjacently overlies a portion of said liner and is receivable within a concavity formed in the underside of the overlying other leaf of said pair of leaves; and a lower enlarged head portion formed at the lower end of said button which is insertable through said liner and said one underlying leaf for locking engagement with the underside of the latter whereby said button means serves to tightly hold said liner to said underlying leaf.

8. A spring including two superimposed leaves, the lower of said leaves having an opening therein, an anti-friction device comprising a non-metallic separator of sheet material disposed between said leaves and in abutting relationship with a surface on each of said leaves, said separator having an opening therein in registration with the opening in said lower leaf, and a rubber-like plug having a central portion extending through the registrating openings in said separator and said lower leaf and terminal portions defining abutments engaging said separator and said lower leaf for clampingly securing said separator and lower leaf together, one of said spring leaves having a recess provided in a surface thereof abutting said separator, said terminal portions comprising rubber-like enlargements, one of said enlarged terminal portions being disposed in said recess to yieldably resist relative lateral movement between said separator and the spring leaf provided with said recess and the other of said terminal portions having its yieldability and size predetermined relative to the size of the opening in said lower spring leaf to accommodate insertion thereof through said opening by pushing on said plug.

9. A spring including two superimposed leaf elements, the lower of said leaf elements having an opening therein, an anti-friction device comprising a non-metallic separator element of sheet material disposed between said leaf elements and in abutting relationship with a surface on each of said leaf elements, said separator element having an opening therein in registration with the opening in said lower leaf element, and a rubber-like plug having a central portion extending through the registrating openings in said separator element and said lower leaf element and terminal portions defining abutments engaging said separator element and said lower leaf element for clampingly securing said separator element and lower leaf element together, one of said elements having a recess provided therein, said terminal portions comprising rubber-like enlargements, one of said enlarged terminal portions being disposed in said recess to accommodate the abutting of said spring leaf elements on said separator element without interference from said last mentioned enlarged terminal portion and the other of said terminal portions having its yieldability and size predetermined relative to the size of the opening in said lower spring leaf element to accommodate insertion thereof through said opening by pushing on said plug.

10. A spring including first and second superimposed leaves, said first leaf having a longitudinal groove formed in the surface thereof adjacent said second leaf and said second leaf having an elongated opening therein with its major axis extending lengthwise of said second leaf, an anti-friction device comprising a non-metallic separator of sheet material disposed between said leaves and in abutting relationship with each of said leaves, said separator having an elongated opening therein in registration with the opening in said second leaf, and a rubber-like plug having a central portion with a cross section approximating the peripheral contour of said registrating elongated openings, said central portion extending through the registrating openings in said separator and said second leaf and terminal portions defining abutments engaging said separator and said second leaf for clampingly securing said separator and second leaf together, said terminal portions comprising rubber-like enlargements, one of said enlarged terminal portions being disposed in the groove in said first leaf to yieldably resist relative lateral movement of said spring leaves and the other of said terminal portions having its yieldability and size predetermined relative to the size of the opening in said second spring leaf to accommodate insertion thereof through said opening by pushing on said plug.

11. A spring including upper and lower superimposed leaves, the lower of said leaves having an opening therein, an anti-friction device comprising a non-metallic separator of sheet material disposed between said leaves and in abutting relationship with a surface on each of said leaves, said separator having an opening therein in registration with the opening in said lower leaf, said separator adjacent the upper leaf of said superimposed leaves having a recessed portion around the periphery of the opening therein, and a rubber-like plug having a central portion extending through the registrating openings in said separator and said lower leaf and terminal portions defining abutments engaging said separator and said lower leaf for clampingly securing said separator and lower leaf together, said terminal portions comprising rubber-like enlargements, one of said enlarged terminal portions being shaped to fit wholly within said recessed portion and being disposed therein and the other of said terminal portions having its yieldability and size predetermined relative to the size of the opening in said lower spring leaf to accommodate insertion thereof through said opening by pushing on said plug.

12. A spring including upper and lower superimposed leaves, the lower of said leaves having an opening therein, an anti-friction device comprising a non-metallic separator of sheet material disposed between said leaves and in abutting relationship with a surface on each of said leaves, said separator having an opening therein in registration with the opening in said lower leaf, said lower spring leaf having a recessed portion adjacent said separator and around the periphery of the opening therein, said terminal portions comprising rubber-like enlargements, one of said enlarged terminal portions being shaped to force portions of said separator surrounding the opening therein into said recessed portion to establish an indentation in the upper surface of said separator, said one enlarged terminal portion being disposed in said indentation and the other of said terminal portions having its yieldability and size predetermined relative to the size of the opening in said lower spring leaf to accommodate insertion thereof through said opening by pushing on said plug.

No references cited.